US012045016B2

(12) United States Patent
Stephey

(10) Patent No.: US 12,045,016 B2
(45) Date of Patent: Jul. 23, 2024

(54) TIMING DEVICE WITH BI-DIRECTIONAL RESET

(71) Applicant: Katamco, LLC, Normal, IL (US)

(72) Inventor: Adam Stephey, Normal, IL (US)

(73) Assignee: Katamco, LLC, Normal, IL (US)

( * ) Notice: Subject to any disclaimer, the term of this patent is extended or adjusted under 35 U.S.C. 154(b) by 186 days.

(21) Appl. No.: 17/385,523

(22) Filed: Jul. 26, 2021

(65) Prior Publication Data

US 2022/0026855 A1 Jan. 27, 2022

Related U.S. Application Data

(60) Provisional application No. 63/057,092, filed on Jul. 27, 2020.

(51) Int. Cl.
*G04F 1/06* (2006.01)

(52) U.S. Cl.
CPC .................................... *G04F 1/06* (2013.01)

(58) Field of Classification Search
CPC ................. G04F 1/04; G04F 1/06; G04F 1/08
See application file for complete search history.

(56) References Cited

U.S. PATENT DOCUMENTS

| | | | | |
|---|---|---|---|---|
| 3,438,197 A * | 4/1969 | Roer | G04F 1/06 968/805 |
| 4,431,313 A * | 2/1984 | Hemperly | G04F 1/06 368/95 |

* cited by examiner

*Primary Examiner* — Renee S Luebke
*Assistant Examiner* — Matthew Hwang
(74) *Attorney, Agent, or Firm* — Husch Blackwell LLP

(57) ABSTRACT

A timer is provided, including a base having opposing ends and opposing sides, and first and second opposing side portions extending in a first direct from the opposing ends of the base. Each of the first and second opposing side portions extends to a respective distal end thereof. The timer also includes a top portion connecting the distal ends of the first and second opposing side portions, and front and rear opposing walls extending from the opposing sides of the base. Each of the front and rear opposing walls is connected to the first and second opposing side portions and the top portion to enclose a cavity therein. A center divider is provided extending from top portion at least partially toward the base. The center divider being affixed to the front and rear opposing walls. A first angled portion is affixed to the front and rear opposing walls and is positioned toward the first opposing side portion relative to the center divider. A second angled portion is affixed to the front and rear opposing walls, mirroring the first angled portion toward the second opposing side portion relative to the center divider. The first and second angled portions are positioned in a generally "V"-shaped arrangement with a hole positioned at the vertex thereof.

13 Claims, 2 Drawing Sheets

TIMING DEVICE WITH BI-DIRECTIONAL RESET

CROSS-REFERENCE TO RELATED APPLICATIONS

This application claims priority to U.S. Provisional Patent Application Ser. No. 63/057,092, filed on Jul. 27, 2020, entitled "TIMING DEVICE WITH BI-DIRECTIONAL RESET," currently pending, the entire disclosure of which is incorporated herein by reference.

FIELD OF INVENTION

The present invention relates generally to a timing device. More particularly, the present invention relates to a timing device that can be reset by clockwise or counterclockwise rotation.

BACKGROUND OF INVENTION

Hourglasses have been known and used for centuries as timing devices. Hourglasses are typically formed from two glass (or otherwise transparent) bulbs connected vertically by a narrow neck. The width of an opening in the neck allows for regulation of the flow of a substance (often sand) from the upper bulb to the lower bulb. The bulbs are generally the same size and shape, such that the hourglass can be used again immediately. This general symmetry generally defines the shape requirements of the hourglass. However, in traditional timers, all of the substance within the timer must flow through the neck before the timer can be reused to its full timing ability. If the timer is reset before all of the substance has passed through the neck, only a partial timing cycle will be completed.

More recently, non-symmetric timers have been created. Such timers have the advantage of always using the same flow-path, and thus the timing is always consistent. An example of such a timer, a timer 100, is illustrated in FIG. 1. The timer 100 includes a base 110, and left and right side portions 112, 114. The left and right side portions 112, 114 extend upwardly from the base to a rounded top portion 116. Front and rear walls 117, 118 serve to enclose an interior of the timer 100. Within the interior, a first angled portion 120 extends approximately from the point at which the left side portion 112 and the rounded top portion 116 meet in a diagonally downward direction. A second angled portion 122 mirrors the first angled portion 120. Unlike the first angled portion 120, the second angled portion 122 is positioned only through engagement with the front and rear walls 117, 118. The second angled portion 122 does not contact the base 110, the left or right side portions 112, 114, or the rounded top portion 116.

The first and second angled portions 120, 122 may be spaced apart from one another, such that an open slit is formed therebetween. Alternatively, the first and second angled portions 120, 122 may connect at a vertex 123, with a simple hole or slit provided therein (not illustrated). Where a hole is provided at the vertex 123, a slight angle may be provided at the vertex 123 toward the hole. In either case, a substance 124 may flow through the hole/slit.

The substance 124 is positioned within the interior of the timer 100. The substance 124 will be referred to hereinafter as sand 124 for the sake of simplicity, but it will be understood that other substances, including liquids, may be used. The flow of the sand 124 through the hole or slit gives the timer 100 its timing capability.

To set the timer 100, the timer 100 is rotated clockwise, so that the sand 124 that has accumulated on the base 110 falls first to the right side portion 114, then to the rounded top portion 116. With further rotation, the first angled portion 122, which extends from the left side portion 112 and/or the top rounded portion 116, prevents the sand 124 from falling to the left side portion 112. Once the timer 100 has been fully rotated by 360°, substantially all sand 124 will be gathered above the first and second angled portions 120, 122, where it will slowly fall through the hole or slit therebetween as in a standard hourglass. A clockwise, 360-degree rotation will again reset the timer 100.

However, such a structure as illustrated in FIG. 1 only works for a clockwise rotation. No current timers of a non-hourglass shape can be reset by other types of rotation, and therefore such timers 100 are inferior as compared to standard hourglasses.

SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

A bi-directional timer is provided that may be reset by rotating the timer in a first direction or in a second direction (e.g. clockwise or counterclockwise). The bi-directional timer may include a base having opposing ends and opposing sides, and first and second opposing side portions extending in a first direction from the opposing ends of the base. Each of the first and second opposing side portions extends to a respective distal end thereof. The bi-directional timer also includes a top portion connecting the distal ends of the first and second opposing side portions, and front and rear opposing walls extending from the opposing sides of the base. Each of the front and rear opposing walls is connected to the first and second opposing side portions and the top portion to enclose a cavity therein.

In addition, a center divider may be provided. The center divider may extend from the top portion at least partially toward the base. The center divider may be affixed to the front and rear opposing walls. A first angled portion may be affixed to the front and rear opposing walls, and may be positioned toward the first opposing side portion relative to the center divider. A second angled portion may be affixed to the front and rear opposing walls, and may substantially mirror the first angled portion toward the second opposing side portion relative to the center divider. The first and second angled portions may be positioned in a generally "V" shape, with a hole, a gap, or a slit provided in the vertex of the "V."

Advantageously, the bi-directional timer may be rotated in either the first direction or the second direction in order to effectuate a reset, as opposed to the prior art timer which may only be reset with rotation in a single direction. Thus, the bi-directional timer is more convenient for the consumer to use. Further, the bi-directional timer is quite different from a traditional hourglass because the bi-directional timer always uses the same flowpath for the sand during timing. Finally, unlike traditional timers, the bi-directional timer may be quickly reset at any time during timing and still provide the user with a full timing cycle.

For a fuller understanding of the nature and advantages of the present invention, reference should be made to the ensuing detailed description and accompanying drawings.

DESCRIPTION OF THE DRAWINGS

For a better understanding of the various embodiments of the present invention, reference may be made to the accompanying drawings in which.

Figure 1:
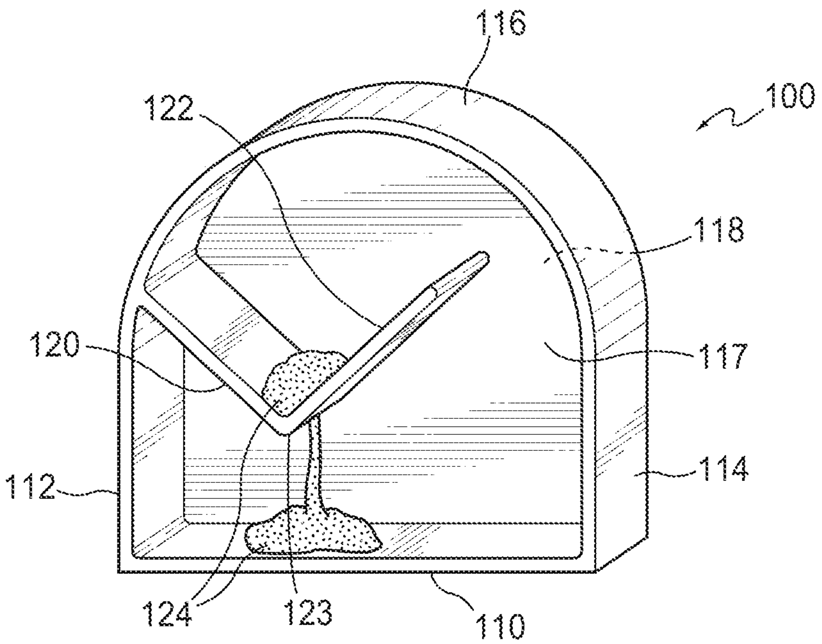
FIG. 1 (PRIOR ART)
FIG. 1 is a perspective view of a prior art timer with a uni-directional timer reset requirement.

While the disclosure is susceptible to various modifications and alternative forms, a specific embodiment thereof is shown by way of example in the drawings and will herein be described in detail. It should be understood, however, that the drawings and detailed description presented herein are not intended to limit the disclosure to the particular embodiment disclosed, but to the contrary, the intention is to cover all modifications, equivalents, and alternatives falling within the spirit and scope of the present disclosure as defined by the appended claims.

DETAILED DESCRIPTION OF THE INVENTION

In the following description, various embodiments of the present invention will be described. For purposes of explanation, specific configurations and details are set forth in order to provide a thorough understanding of the embodiments. It will also be apparent to one skilled in the art, however, that the present invention may be practiced without the specific details. Furthermore, well-known features may be omitted or simplified in order not to obscure the embodiment being described.

Figure 2:
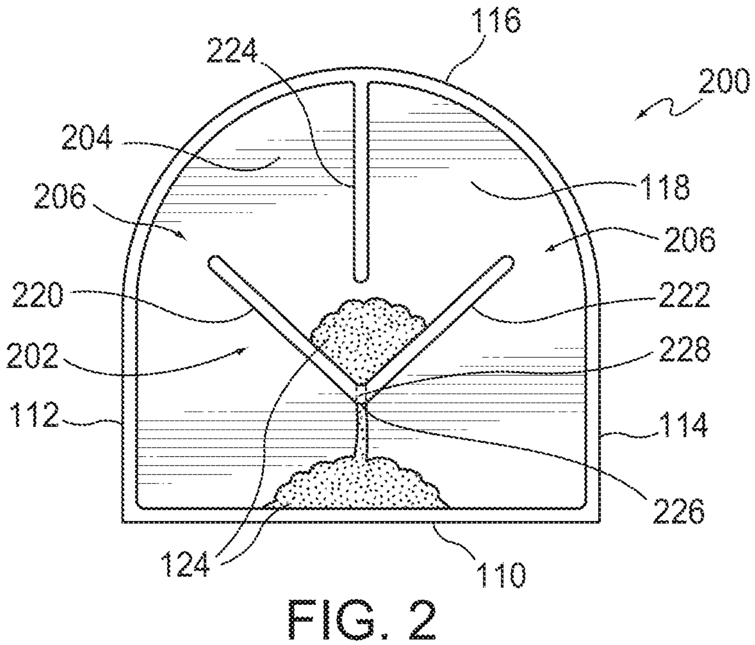
FIG. 2 is a cross-sectional front elevation view of a timer with a bi-directional reset capability according to an example embodiment.

FIG. 2 illustrates a cross-sectional slice through a bi-directional timer 200 (hereinafter "timer 200"); for ease of reference, it can be seen that substantially the same base 110, left and right side portions 112, 114, top portion 116, rear wall 118, and the sand 124 of the prior art timer 100 are included with the timer 200. However, the timer 200 includes at least one receiving member 202 provided within a cavity 204. The cavity 204 may be enclosed by the base 110, left and right side portions 112, 114, top portion 116, front wall 117 (not illustrated) and the rear wall 118. The at least one receiving member 202 is positioned such that gaps 206 are provided between the at least one receiving member 202 and the left and ride side portions 112, 114.

In the illustrated embodiment, the at least one receiving member 202 is provided as a first angled portion 220 and a second angled portion 222. Compared to the prior art, the first angled portion 220 has been shifted laterally away from the left side portion 112 and towards the right side portion 114. Also, the second angled portion 222 has been correspondingly shifted laterally. In effect, the first and second angled portions 220, 222 do not contact the base 110, the left or right side portions 112, 114, or the rounded top portion 116. Thus, the sand 124 may move through the gaps 206 provided within the cavity 204.

Both the first and second angled portions 220, 222 may be affixed to at least one of the front and rear walls 117, 118. For example, in one embodiment, the first and second angled portions 220, 222 may be affixed to both the front and rear walls 117, 118. In another embodiment, the first and second angled portions 220, 222 may be affixed to the rear wall 118. In this embodiment, the first and second angled portions 220, 222 may extend towards the front wall 117 along their length, substantially filling the space between the front and rear walls 117, 118.

In the illustrated embodiment of the timer 200, the first and second angled portions 220, 222 are substantially linear and are positioned in a generally "V"-shaped arrangement. In alternative embodiments, the first and second angled portions 220, 222 may be curved and positioned such that they form a generally "U"-shaped arrangement. In yet other embodiments, the first and second angled portions 220, 222 may be otherwise shaped and positioned as would be appreciated by those skilled in the art. In yet further embodiments, the at least one receiving member 202 may be provided in the form of a bowl, an open cone with an interior cavity, an open prism with an interior cavity, or other forms that would be appreciated by those skilled in the art.

A center divider 224 may extend down from approximately the center of the top portion 116. The center divider 224 may generally be positioned above the first and second angled portions 220, 222. More particularly, the center divider 224 may generally be positioned above a vertex 226 where the first and second angled portions 220, 222 adjoin. In other embodiments of the timer 200, the center divider 224 may be offset from the vertex 226. Advantageously, the addition of the center divider 224 and the shift in positioning of the first and second angled portions 220, 222 allow the timer 200 to be reset when rotated either in a first direction or a second direction (e.g. a clockwise direction or a counterclockwise direction), as discussed below.

An opening 228 may be provided at the vertex 226. The opening 228 may allow for the sand 124 to flow through the vertex 226. The opening 228 may be provided in the form of a gap, a hole, a slit, or other similar open spaces as would be appreciated by those skilled in the art. In embodiments of the timer 200 wherein the receiving member 202 does not include a vertex (e.g. if the receiving member 202 is provided in the shape of a bowl), the opening 228 may be provided within the receiving member 202 such that gravity can draw the sand 124 through the opening 228.

In the illustrated embodiment, the center divider 224 is affixed to the front and rear walls 117, 118. In alternative embodiments, the center divider 224 may be affixed to at least one of the front wall 117, the rear wall 118, and the top portion 116. In embodiments in which the center divider 224 neither extends from nor is affixed to the top portion 116, the center divider may abut the top portion 116. In yet other embodiments, the center divider 224 may be formed as a protrusion extending from at least one of the top portion 116, the front wall 117, and the rear wall 118.

In one embodiment of the invention, the base 110, the left and right side portions 112, 114, the top portion 116, and the front and rear walls 117, 118 may be constructed of a transparent material. The use of a transparent material may allow a user to see into the interior of the timer 200 such that the user can determine when the timing of the timer 200 is complete. The transparent material may be composed of acrylic, glass, polycarbonate, or another suitable substance as would be appreciated by those skilled in the art. In other embodiments of the invention, at least one of the base 110, the left and right side portions 112, 114, the top portion 116, and the front and rear walls 117, 118 may be composed of a transparent material such that a user can see into the interior of the timer 200. For example, in such an embodiment, the front wall 117 may be composed of a transparent material while the remaining portions and walls may be composed of an opaque material. However, other combinations of opaque and transparent sides and portions of the timer 200 would be appreciated by those skilled in the art.

Figure 3:
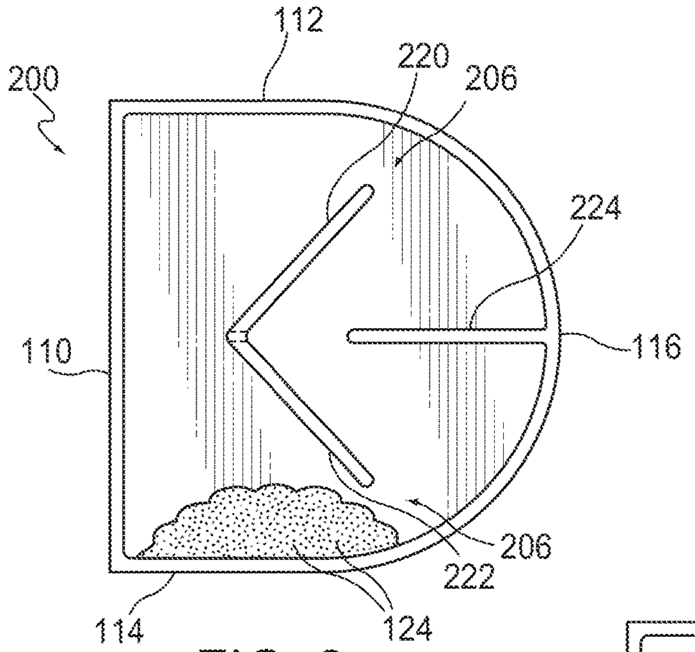
FIG. 3 illustrates the timer of FIG. 2 having been rotated by 90° in a clockwise direction.
Figure 4:
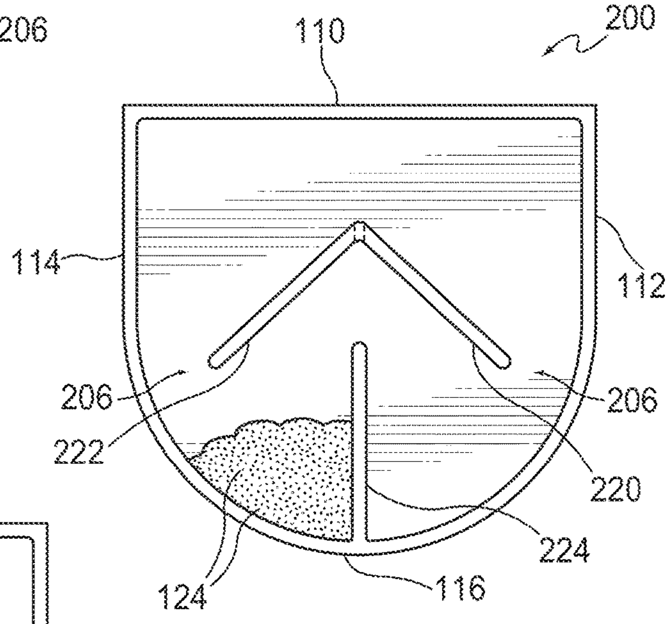
FIG. 4 illustrates the timer of FIG. 3 having been rotated by an additional 90° in a clockwise direction, for a total of 180° from that shown in FIG. 2.
Figure 5:
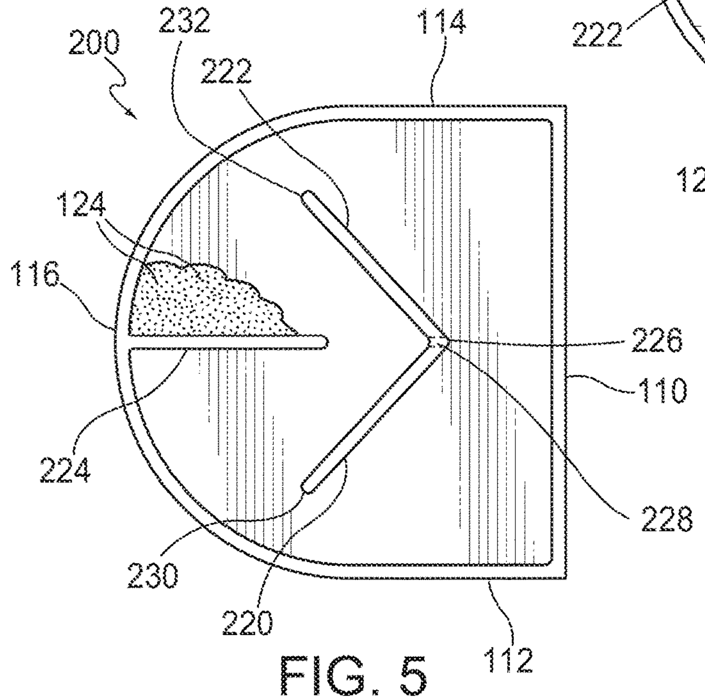
FIG. 5 illustrates the timer of FIG. 4 having been rotated by an additional 90° in a clockwise direction, for a total of 270° from that shown in FIG. 2.

FIGS. 3-5 illustrate one example operation of the timer 200, in which a user may rotate the timer 200 clockwise. As the user rotates the timer 200, the sand 124 may travel from the base 110, through the gap 206, and be disposed upon the first and second angled portions 220, 222. FIG. 3 illustrates a 90° clockwise rotation in which the sand 124 has fallen to rest on the right side portion 114. FIG. 4 illustrates a further 90° clockwise rotation (180° rotation from FIG. 2) in which the sand 124 has fallen through the gap 206 and onto the top portion 116. Unlike in the prior art, however, the lateral movement of the sand 124 towards the left side portion 112 is blocked by the center divider 224. FIG. 5 illustrates a further 90° clockwise rotation (270° rotation from FIG. 2) in which the sand 124 now rests on the center divider 224, and is prevented from falling down to the left side portion 112 as it did in the prior art timer 100. A further 90° clockwise rotation brings the timer 200 back to the position shown in FIG. 2. The sand 124 may then fall through the opening 228 positioned at the vertex 226, allowing the timer 200 to perform its intended function.

Importantly, as will be understood by one skilled in the art, because the timer 200 is generally symmetrical, a mirrored reset procedure may be conducted with a counterclockwise turn. Thus, the timer 200 may be rotated in either the clockwise or the counterclockwise direction in order to effectuate a reset, as opposed to the prior art timer 100 which may only be reset with rotation in a single direction. Further, because the timer 200 may be reset with a 360° rotation (as compared to the 180° rotation used with traditional hourglasses), the timer 200 may be reset at any time during timing and still provide the user with a full timing cycle.

In alternative embodiments of the timer 200, flanges (not illustrated) may be included to help catch the sand 124 as it falls from the top portion 116 and onto the first and second angled portions 220, 222. The flanges may be (but are not limited to) planar or cylindrical protrusions coupled to the first and second angled portions 220, 222. The flanges may extend outwards from the first and second angled portions 220, 222 and at least partially towards the top portion 116. Further, the flanges may be positioned at ends 230, 232 of the first and second angled portions 220, 222 such that the flanges are positioned opposite of the vertex 226, although other positions for the flanges are foreseeable.

In various embodiments of the invention, the timing of the timer 200 may be modified. For example, the amount of sand 124 within the timer 200 could be altered. In such an embodiment, increasing the amount of sand 124 within the timer 200 may increase the timing of the timer 200. Also, the size of the opening 228 could be altered. In such an embodiment, a smaller opening may increase the timing of the timer 200.

While reference has been made to clockwise and counterclockwise resets for the timer 200, the timer 200 is not limited to such resets. For example, through a repositioning of the center divider 224 and the first and second angled portions 220, 222, the timer 200 could instead be reset through a forward or a backward rotation. Further, the timer 200 may be provided without the center divider 224, which may allow for additional rotational resets of the timer 200.

From the foregoing, it will be seen that the various embodiments of the present invention are well adapted to attain all the objectives and advantages hereinabove set forth together with still other advantages which are obvious and which are inherent to the present structures. It will be understood that certain features and sub-combinations of the present embodiments are of utility and may be employed without reference to other features and sub-combinations. Since many possible embodiments of the present invention may be made without departing from the spirit and scope of the present invention, it is also to be understood that all disclosures herein set forth or illustrated in the accompanying drawings are to be interpreted as illustrative only and not limiting. The various constructions described above and illustrated in the drawings are presented by way of example only and are not intended to limit the concepts, principles and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required."

Many changes, modifications, variations and other uses and applications of the present constructions will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A timer including:

a base including a first end and a second end, the second end positioned opposite of the first end;

a left side portion coupled to the first end of the base, and a right side portion coupled to the second end of the base;

a top portion coupled to the left side portion and the right side portion;

a center divider extending downwardly from the top portion; and at least one receiving member positioned between the center divider and the base;

wherein the timer may be reset by rotating the timer in a first direction or by rotating the timer in a second direction.

2. The timer of claim 1, the timer further including a material chosen from one of a liquid and a granular solid.

3. The timer of claim 1, wherein the at least one receiving member includes a first angled portion and a second angled portion, the first angled portion and the second angled portion being positioned in a generally V-shaped arrangement.

4. The timer of claim 1, wherein a first gap is provided between the at least one receiving member and the left side portion, and a second gap is provided between the at least one receiving member and the right side portion.

5. The timer of claim 1, wherein the at least one receiving member is affixed to at least one of a front wall and a rear wall of the timer.

6. The timer of claim 1, wherein an opening is provided within the at least one receiving member.

7. The timer of claim 1, the timer further including a front wall and a rear wall coupled to opposing sides of the base, and wherein at least one of the front wall and the rear wall is transparent.

8. A timer including:

a base having opposing ends and opposing sides;

first and second side portions extending in a first direction from the opposing ends of the base, each of the first and second side portions extending to a respective distal end thereof;

a top portion coupled to the respective distal ends of the first and second side portions;

front and rear opposing walls extending from the opposing sides of the base, each connected to the first and second opposing side portions and the top portion;

at least one receiving member coupled to at least one of the front and rear opposing walls; and a center divider having a first end and a second end opposing the first end, the first end of the center divider being coupled to the top portion and extending downwardly therefrom;

wherein a distance between the first end and the second end of the center divider is less than a distance between the top portion and the base.

9. The timer of claim 8, the timer further including a material chosen from a liquid or a granular solid, the material disposed within a space defined by the base, the first and second side portions, the top portion, and the front and rear opposing walls.

10. The timer of claim 8, wherein the at least one receiving member is:

a first angled portion affixed to at least one of the front and rear opposing walls, and positioned toward the first opposing side portion relative to the center divider; and a second angled portion affixed to at least one of the front and rear opposing walls, and mirroring the first angled portion toward the second opposing side portion relative to the center divider.

11. The timer of claim 8, wherein the at least one receiving member is:

a first angled portion coupled to at least one of the front and rear opposing walls; and a second angled portion coupled to at least one of the front and rear opposing walls.

12. The timer of claim 11, wherein the first angled portion extends at least partially downwardly and towards the second angled portion, and the second angled portion extends at least partially downwardly and towards the first angled portion.

13. The timer of claim 8, wherein the timer can be reset by rotation in a first direction or by rotation in a second direction.

* * * * *